(12) United States Patent
Kuwata et al.

(10) Patent No.: US 10,171,259 B2
(45) Date of Patent: Jan. 1, 2019

(54) NETWORK SYSTEM AND RELAY DEVICE

(71) Applicant: APRESIA Systems, Ltd., Chuo-ku, Tokyo (JP)

(72) Inventors: Hitoshi Kuwata, Tsuchiura (JP); Toshihiko Murakami, Fujieda (JP); Tatsuro Matsumoto, Tsuchiura (JP)

(73) Assignee: APRESIA Systems, Ltd., Tokyo (JP)

( * ) Notice: Subject to any disclaimer, the term of this patent is extended or adjusted under 35 U.S.C. 154(b) by 43 days.

(21) Appl. No.: 15/286,814

(22) Filed: Oct. 6, 2016

(65) Prior Publication Data
US 2017/0244572 A1    Aug. 24, 2017

(30) Foreign Application Priority Data

Feb. 23, 2016  (JP) ................. 2016-031638
May 27, 2016  (JP) ................. 2016-105727

(51) Int. Cl.
*H04L 12/18* (2006.01)
*H04L 12/46* (2006.01)

(52) U.S. Cl.
CPC ...... *H04L 12/1886* (2013.01); *H04L 12/4645* (2013.01); *H04L 2212/00* (2013.01)

(58) Field of Classification Search
CPC ............. H04L 12/1886; H04L 12/4645; H04L 2212/00

USPC .................................................. 370/229, 230
See application file for complete search history.

(56) References Cited

U.S. PATENT DOCUMENTS

| 2011/0235647 A1* | 9/2011 | Baba .................. H04L 12/4625 370/401 |
| 2012/0008491 A1* | 1/2012 | Shimada ............. H04L 12/4633 370/218 |
| 2016/0142226 A1* | 5/2016 | Huang ................ H04L 12/4633 370/392 |

FOREIGN PATENT DOCUMENTS

WO    WO 2015/136875 A1    9/2015

* cited by examiner

*Primary Examiner* — Obaidul Huq
(74) *Attorney, Agent, or Firm* — Crowell & Moring LLP

(57) ABSTRACT

A network system includes: a VXLAN region that is connected to a vEPC virtual network and in which encapsulation by VXLAN is performed; a PBB region in which encapsulation by PBB is performed; an edge router that belongs to the VXLAN region and is connected to an edge switch in the PBB region; and an edge switch that belongs to the PBB region and is connected to the edge router. The edge router performs conversion between a VNID of data encapsulated by the VXLAN and an intermediate CVID of decapsulated data exchanged with the edge switch, and the edge switch performs conversion between an ISID of data encapsulated by the PBB and the intermediate CVID.

6 Claims, 12 Drawing Sheets

NETWORK SYSTEM AND RELAY DEVICE

CROSS-REFERENCE TO RELATED APPLICATION

The present application claims priority from Japanese Patent Applications No. 2016-031638 filed on Feb. 23, 2016 and No. 2016-105727 filed on May 27, 2016, the contents of which are hereby incorporated by reference into this application.

TECHNICAL FIELD OF THE INVENTION

The present invention relates to a network technology. More specifically, the present invention relates to a technology effectively applied to a relay device used in a wide-area network configuration and a network system including the relay device.

BACKGROUND OF THE INVENTION

For example, WO 2015/136875 (Patent Document 1) describes that in a case where VLANs (Virtual Local Area Networks) are used for separation into a large number of logical networks in a large-scale mobile network to which server virtualization is introduced, the network is separated in units of VNI/VNID (VXLAN Network Identifier (hereinafter referred to as "VNID"), 24 bits) by applying VXLAN (Virtual eXtensible Local Area Network) as a countermeasure against the shortage of VLAN-IDs (12 bits).

SUMMARY OF THE INVENTION

For example, in a mobile network system, it is sometimes necessary to make a configuration chancre such as relocation of an EPC (Evolved Packet Core) due to malfunction of a device constituting a core network such as an EPC. In this case, it is necessary to avoid a change of settings such as an IP address of the EPC on the side of an eNodeB (evolved Node B: base station (hereinafter referred to as "eNB")).

Conventionally, for example, the following complicated procedure has been taken. First, an IP network segment that is similar to that at the original location of the EPC is manually constructed at the destination of the EPC. Then, the EPC is relocated while keeping the settings such as an IP address at the original location. Next, routing information of the new IP segment at the destination is exchanged between routers of an IP core network in a mobile backhaul (MBH). The reason why such a complicated procedure is needed is that an IP address used in an EPC and an eNB is used for routing in an MBH. Meanwhile, for example, use of an encapsulation technique such as a VXLAN described in Patent Document 1 makes it possible to separate an IP address used in an EPC and an eNB from a routing process in an MBH.

In this case, communication between VTEPs (VXLAN Tunnel End Points) at ends of VXLAN becomes multicast in L3 instead of the simple broadcast in L2. This is because the VXLAN is an L2 over L3 network (Multipoint NW over point-to-point NW). Accordingly, communication is performed between every pair of VTEPs, and the required number of multicast groups exponentially increases in accordance with the number of VTEPs. For example, in a case of the configuration in which the whole MBH is encapsulated by VXLAN, the number of eNBs connected to the VXLAN via VTEPs increases. As a result, the number of VTEPs increases and the load of multicast increases, so that a problem arises in scalability.

The present invention has been made in view of the above circumstances, and an object of the present invention is to provide a network system and a relay device that reduce load of multicast between VTEPs in a VXLAN region in a wide-area network to which VXLAN is applied.

The above and other objects and novel characteristics of the present invention will be apparent from the description of the present specification and the accompanying drawings.

The following is a brief description of an outline of the representative invention disclosed in the present application.

A network system according to a representative embodiment of the present invention includes a second network that is connected to a first network, at least part of which is constituted of a virtual machine on a virtual network, and that transfers first encapsulated data obtained by first encapsulation using an L2 over L3 encapsulation method and a third network that is connected to the second network and transfers second encapsulated data obtained by second encapsulation using an L2 over L2 encapsulation method. The network system further includes a first relay device that belongs to the second network, is connected to the third network, and performs a process concerning the first encapsulation and a second relay device that belongs to the third network, is connected to the second network, and performs a process concerning the second encapsulation.

In addition, the first relay device performs conversion between a first identifier of data encapsulated by the first encapsulation in the second network and a third identifier of decapsulated data exchanged with the second relay device. Also, the second relay device performs conversion between a second identifier of data encapsulated by the second encapsulation in the third network and the third identifier of the decapsulated data exchanged with the first relay device.

The effects obtained by representative embodiments of the invention disclosed in the present application will be briefly described below.

That is, according to a representative embodiment of the present invention, it is possible to reduce load of multicast between VTEPs in a VXLAN region in a wide-area network to which VXLAN is applied.

BRIEF DESCRIPTIONS OF THE DRAWINGS

DESCRIPTIONS OF THE PREFERRED EMBODIMENTS

Figure 1:
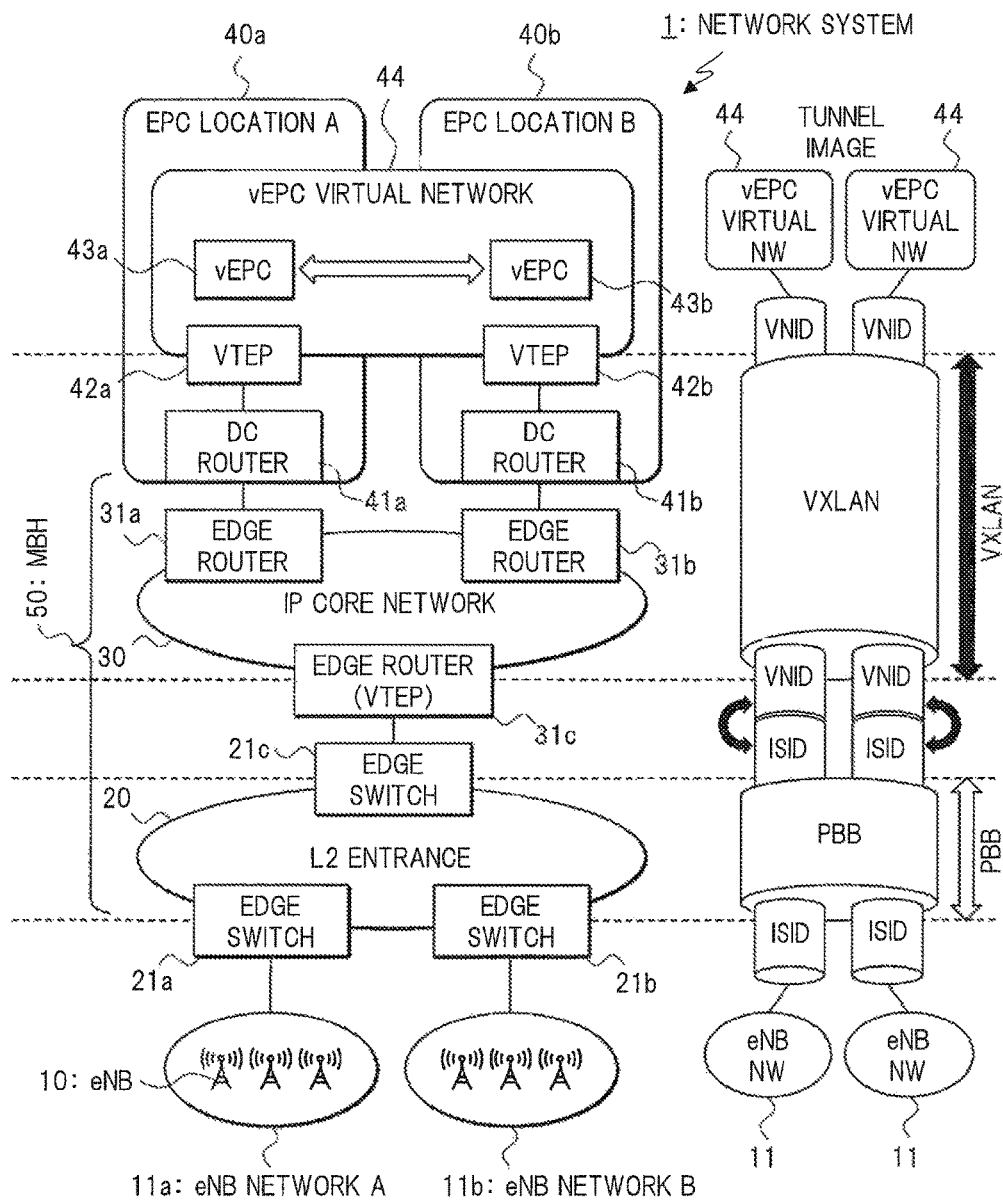
FIG. 1 is a diagram illustrating an outline of an example of a configuration of a network system according to a first embodiment of the present invention and an example of a tunnel image obtained by encapsulation.

Hereinafter, embodiments of the present invention will be described in detail with reference to the drawings. Note that the same parts are denoted by the same reference characters throughout the drawings for describing the embodiments, and the repetitive description thereof is omitted. Meanwhile, a part described and denoted by a reference character in one drawing is not illustrated again in the description of other drawings, but is sometimes referred to by using the same reference character.

The present invention is described below in comparison with a conventional art in order to make the features of the present invention easy to understand. Although an example in which the present invention is applied to a mobile network system such as an LTE (Long Term Evolution) is described below, application of the present invention is not limited to this. The present invention is applicable as appropriate to a wide-area network such as a VPN (Virtual Private Network) having a configuration made up of an access network at a terminal, a core network (backbone line) at the center, and a backhaul that is a network connecting the access network and the core network.

Outline

Figure 10:
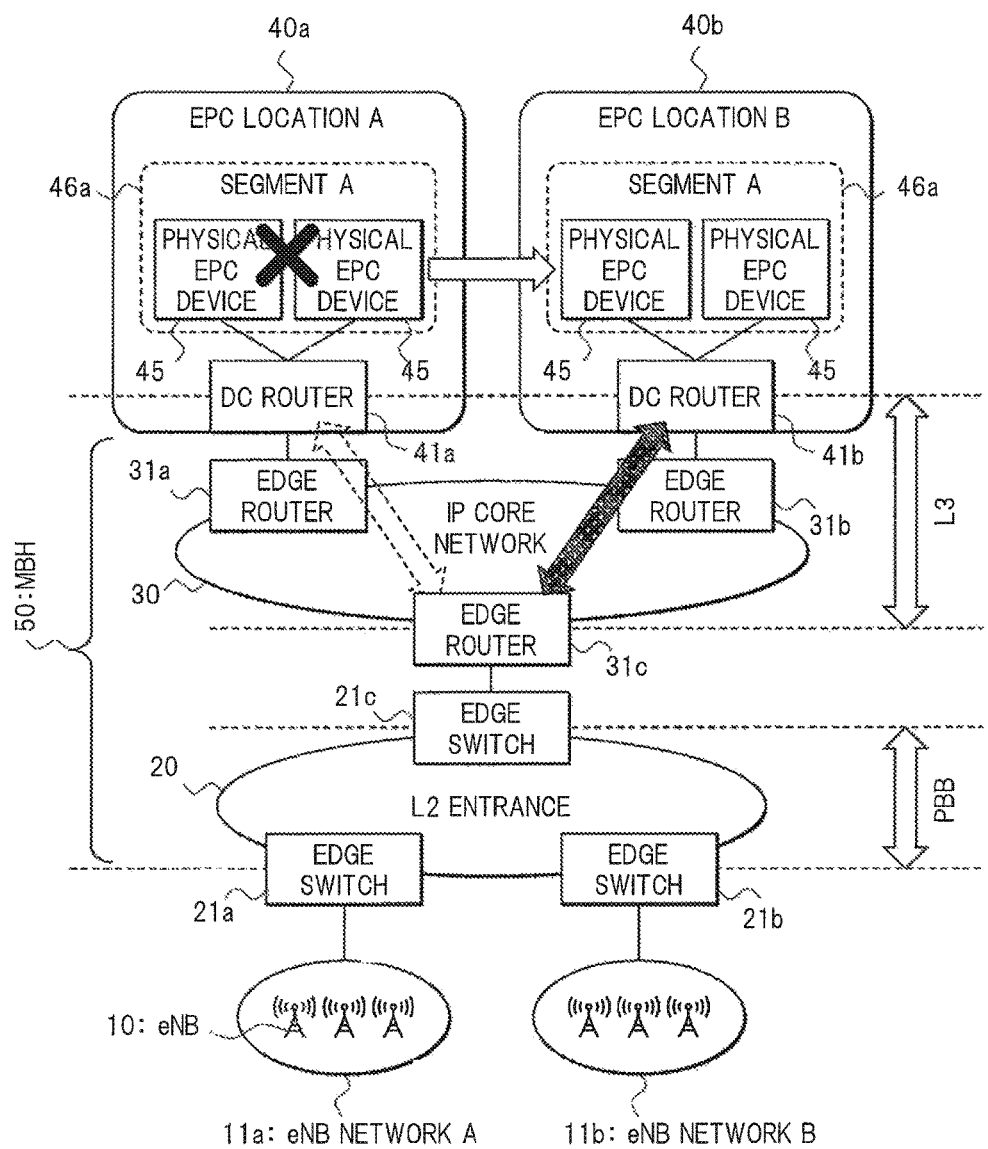
FIG. 10 is a diagram illustrating an outline of an example of a configuration of a conventional mobile network system and an example of relocation of an EPC.

FIG. 10 is a diagram illustrating an outline of an example of a configuration of a conventional mobile network system and an example of relocation of an EPC. The mobile network illustrated in FIG. 10 is made up of a plurality of eNB networks 11 (eNB networks A (11a) and B (11b) in FIG. 10) that are access networks at a terminal, a plurality of physical EPC devices 45 that constitute a core network, and an MBH 50 connecting the plurality of eNB networks 11 and the plurality of physical EPC devices 45. The physical EPC devices 45 are provided at a plurality of EPC locations 40 (EPC locations A (40a) and B (40b) in FIG. 10) such as data centers. A plurality of eNBs 10 belong to each of the eNB networks 11.

The MBH 50 is a network that is constituted of an L2 entrance 20 which is an L2 network and an IP core network 30 which is an L3 network. The L2 entrance 20 has a plurality of edge switches 21 (edge switches 21a to 21c in FIG. 10). The IP core network 30 has a plurality of edge routers 31 (edge routers 31a to 31c in FIG. 10).

The eNBs 10 in the eNB networks A (11a) and B (11b) are contained in the edge switches 21a and 21b of the L2 entrance 20, respectively. In addition, data center (DC) routers 41a and 41b of the EPC locations A (40a) and B (40b) are connected to the edge routers 31a and 31b of the IP core network 30, respectively. The L2 entrance 20 and the IP core network 30 are connected to each other via the upper edge switch 21c and the lower edge router 31c. The edge router 31c functions as a default gateway of the eNBs 10.

The L2 entrance 20 can be constituted by, for example, PBB (Provider Backbone Bridging) which is a technique used for installation of a wide-area Ethernet. The PBB is standardized as IEEE802.1ah. In this case, each of the edge switches 21 is constituted of a PBB edge switch having a PBB function such as encapsulating a MAC (Media Access Control) frame of the eNB 10 in a MAC frame of the edge switch 21 in accordance with a so-called MAC-in-MAC method.

For example, assume that the physical EPC devices 45 become inoperable due to some sort of malfunction in a state where an EPC is constructed on a segment A (46a) of an IP network in the EPC location A (40a) by the various physical EPC devices 45 and each eNB 10 accesses the EPC on the EPC location A (40a) via the MBH 50. In this case, it is necessary to promptly move functions of the EPC realized by the physical EPC devices 45 to another EPC location B (40b), i.e., construct new similar physical EPC devices 45 on the EPC location B (40b).

In this case, the following complicated operation is needed because it is necessary to avoid change of network settings such as an IP address of the eNB 10 and the default gateway (the edge router 31c in the example of FIG. 10) before and after the relocation of the EPC. Specifically, first, an environment (a network environment of the physical EPC devices 45 and the segment A (46a)) similar to that in the EPC location A (40a) that is an original EPC location is manually constructed in the EPC location B (40b) that is a destination. In this case, network settings such as an IP address of each physical EPC device 45 remain the same segment. A (46a) as the EPC location A (40a) that is the original EPC location.

Then, a default gateway (the DC router 41b in the example of FIG. 10) of the segment A (46a) is manually created in the EPC location B (40b). Furthermore, routing information of the segment A (46a) of the EPC location B (40b) needs to be newly exchanged between the DC router 41b and each edge router 31. This allows each eNB 10 to access the EPC (the physical EPC device 45) on the EPC location B (40b).

The reason why such a complicated process is needed is that a routing process is performed in the MBH 50 on the basis of the IP address used in the EPC and the eNBs 10. As a solution to this, use of an encapsulation technique such as VXLAN makes it possible to separate the IP address used in the EPC and the eNBs 10 from the routing process in the MBH 50.

In the present embodiment, an EPC is constituted of virtual machines (hereinafter also referred to as "vEPCs") that are constructed on a virtual network in order to make relocation of a physical EPC easy and conceal the influence thereof.

Figure 11:
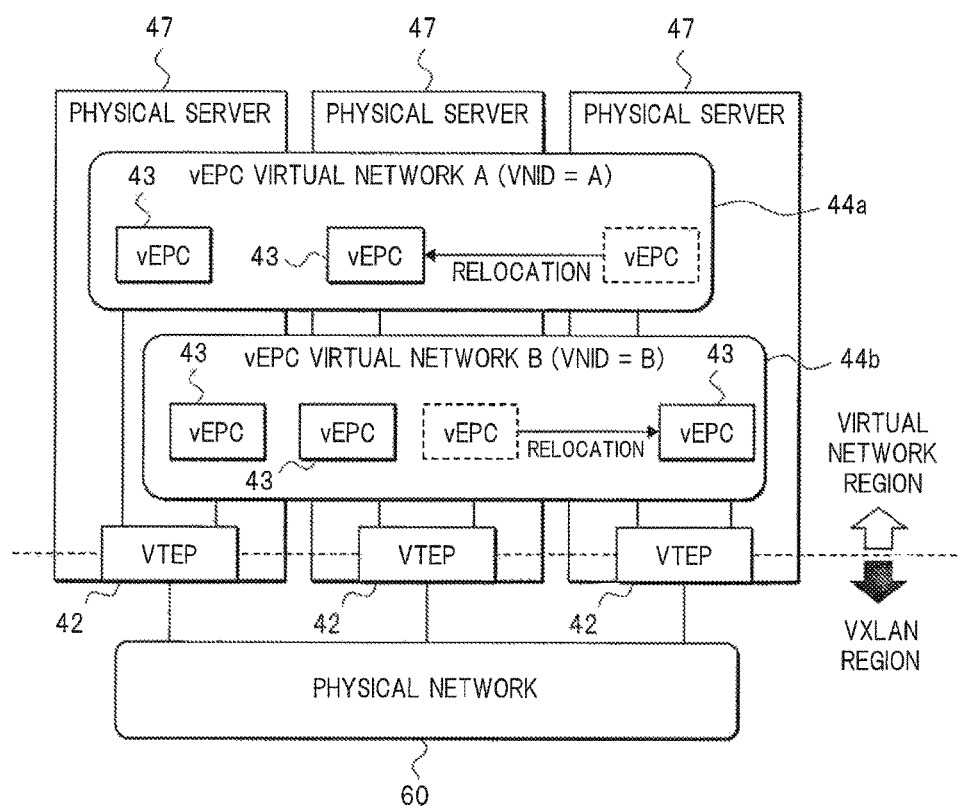
FIG. 11 is a diagram illustrating an outline of an example of a case where VXLAN is applied to an EPC environment constituted of virtual machines and virtual networks.

FIG. 11 is a diagram illustrating an outline of an example in which VXLAN is applied to an EPC environment constituted of virtual machines and virtual networks. FIG. 11 illustrates an environment that is made up of a plurality of physical servers 47 including ones at different locations and a physical network 60 that is an IP network to which the plurality of physical servers 47 are connected. In this environment, a plurality of vEPCs 43 are constructed on vEPC virtual networks 44 (a vEPC virtual network A (44a) identified by VNID=A and a vEPC virtual network B (44b) identified by VNID=B in FIG. 11) that are constructed to include the plurality of physical servers 47. A publicly known technique can be used as appropriate to construct the virtual machines and virtual networks.

Here, the VXLAN is applied to the physical network 60 to which the physical servers 47 are connected. This makes it possible to separate network management in a virtual network region constituted of the vEPC virtual networks 44 and the vEPCs 43 and network management in a VXLAN region terminated at VTEPs 42 provided in the physical servers 47 or the like as illustrated in FIG. 11.

Namely, for example, even in a case where the vEPC 43 which is a virtual machine is generated or relocated to a different physical server 47, change of settings or the like is unnecessary as long as L3 reachability is secured among the VTEPs 42 in the VXLAN region including the VTEPs 42 because the generation or relocation of the vEPC 43 does not affect the settings of the physical network 60 if the vEPC 43 is generated or relocated within the same vEPC virtual network 44. This makes it possible to increase the flexibility of the configuration in the virtual network region without the influence of routing specifications of the physical network 60 (e.g., the IP core network 30 in the example of FIG. 10). Note that a publicly known technique can be used as appropriate to manage such an environment constituted of virtual machines and virtual networks by application of the VXLAN.

Meanwhile, for example, in a case where the EPC environment is constituted of the vEPCs 43 constructed on the vEPC virtual networks 44 as illustrated in FIG. 11 and the whole MBH 50 is encapsulated by application of the VXLAN in the environment illustrated in FIG. 10, a problem can arise in multicast among the VTEPs. Namely, since the VXLAN is an L2 over L3 network, communication among the VTEPs in the VXLAN region becomes multicast in L3 instead of the simple broadcast in L2.

Figure 12:
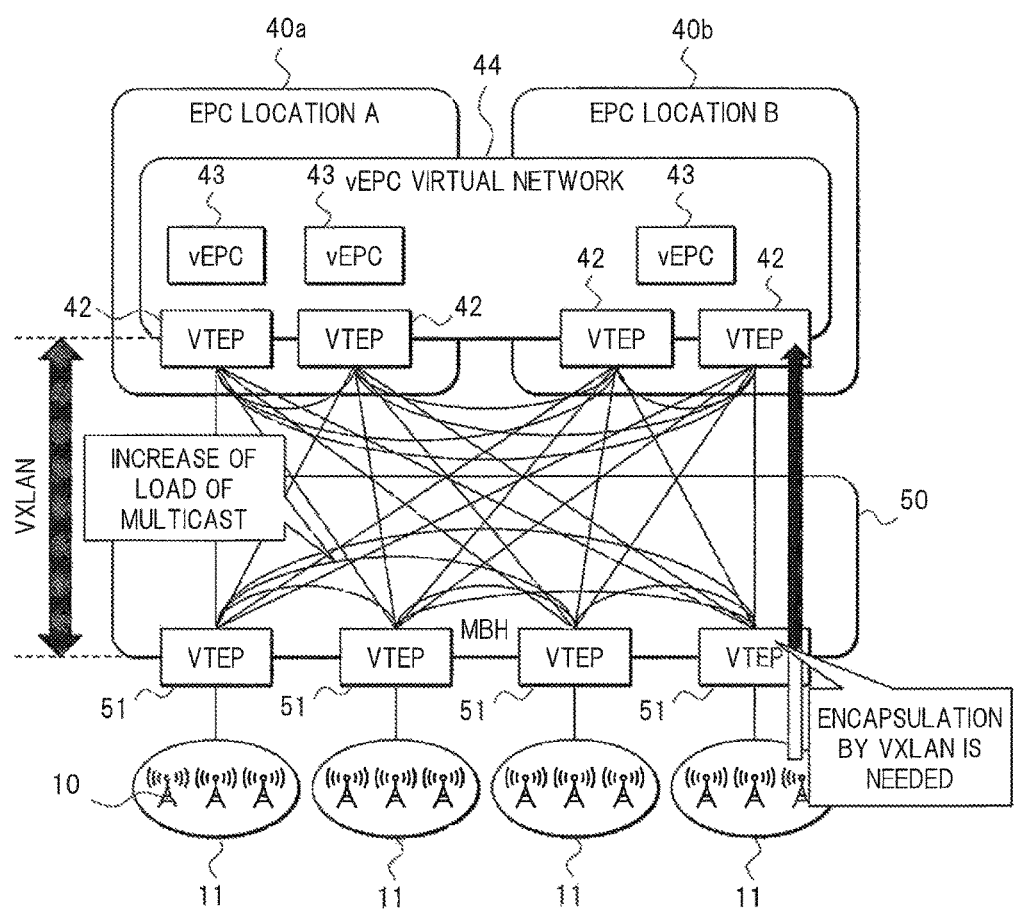
FIG. 12 is a diagram illustrating an outline of an example of a problem that occurs in a case where VXLAN is applied to a vEPC environment.

FIG. 12 is a diagram illustrating an outline of an example of a problem that occurs in a case where VXLAN is applied to a vEPC environment. In the example of FIG. 12, an EPC environment is constituted of a vEPC virtual network 44 and vEPCs 43 in EPC locations 40 (EPC locations A (40a) and B (40b) in FIG. 12). In this EPC environment, in a case where the whole MBH 50, i.e., a range from the vEPCs 43 to the eNBs 10 is encapsulated by the VXLAN, VTEPs 51 on the side of the eNBs 10 are provided in accordance with the number of the eNBs 10.

Here, multicast among the VTEPs (VTEPs 42 and the VTEPs 51) is performed between every pair of VTEPs in a mesh-like manner as illustrated in FIG. 12. Namely, when the number of VTEPs is n, the required number of multicast groups is $2^n$ and exponentially increases as the number of VTEPs increases. Accordingly, in a case where the VXLAN is applied to the whole MBH 50, the number of VTEPs 42 and the number of VTEPs 51 increase in accordance with the number of eNBs 10 and the number of data centers (EPC locations 40), and the required number of multicast groups increases accordingly. As a result, load increases and a problem arises in scalability of the system.

Meanwhile, in the configuration illustrated in FIG. 12, there is no advantage of encapsulation by VXLAN because relocation of the eNBs 10 is not assumed unlike the vEPCs 43. However, a virtual network (VLAN) that constitutes the eNB networks 11 and a VXLAN technology are not compatible with each other. This poses a problem that encapsulation by VXLAN is needed somewhere in order for the eNBs 10 to communicate with the vEPCs 43 via the VXLAN region.

First Embodiment

A network system according to a first embodiment of the present invention has the following configuration in order to solve the above problems. Specifically, relocation or the like of a vEPC 43 within a vEPC virtual network 44 is coped with by constructing an L3 network in which VXLAN is applied only to part of an MBH 50 on the side close to the vEPCs 43 instead of applying VXLAN to the whole MBH 50. Furthermore, an L2 network in which part of the MBH 50 on the side close to the eNBs 10 is encapsulated by PBB or the like is constructed and combined with the L3 network. This produces an advantage of encapsulation by VXLAN in relocation or generation of the vEPC 43 between EPC locations 40. Furthermore, since the VXLAN is not applied to the side of the eNBs 10 that are not relocated, a range of multicast (the number of VTEPs) in the VXLAN is reduced, and this reduces load of multicast and secures scalability.

Overall Configuration

FIG. 1 is a diagram illustrating an outline of an example of a configuration of a network system according to the first embodiment of the present invention and an example of a tunnel image obtained by encapsulation. In the example of the configuration illustrated on the left side of FIG. 1, an EPC environment is configured to include vEPCs 43 (vEPCs 43a and 43b in FIG. 1) constructed on a vEPC virtual network 44 (first network) in EPC locations 40 (EPC locations A (40a) and B (40b) in FIG. 1), unlike the conventional configuration illustrated in FIG. 10.

Further, VXLAN is applied to a region (second network) from an IP core network 30 which is part of the MBH 50 on the side close to the vEPCs 43 to the vEPC virtual network 44, and VTEPs are accordingly provided at both ends of the VXLAN region. Namely, an edge router 31c that is present at a portion where the IP core network 30 is connected to an L2 entrance 20 is a VTEP. Furthermore, VTEPs 42 (VTEPs 42a and 42b in FIG. 1) are provided in the EPC locations 40 at portions connected to the vEPC virtual network 44.

As described above, the VXLAN is applied to only part of the MBH 50 on an upper side (side close to vEPC 43), and the L2 entrance 20 (third network) on a lower side (side close to eNB 10) is constituted by PBB. This makes it possible to markedly reduce the number of VTEPs by converging the VTEPs on the lower side into the edge router 31c, unlike the conventional configuration illustrated in FIG. 12.

In this configuration, for example, communication from eNB networks 11 is encapsulated (second encapsulation) by PBB (L2 over L2 encapsulation method) in a region (third network) of the L2 entrance 20 as indicated by the tunnel image illustrated on the right side of FIG. 1. Then, the eNB networks 11 are identified by ISIDs (Service Instance IDs). Meanwhile, communication is encapsulated (first encapsulation) by the VXLAN (L2 over L3 encapsulation method) in a region (second network) from the IP core network 30 to the vEPC virtual network 44. Then, the vEPC virtual network 44 is identified by a VNID. In the present embodiment, seamless relay is achieved by conversion/mapping between an ISID of the PBB and a VNID of the VXLAN as described later.

In this configuration, even in a case where the vEPC 43 is relocated within the vEPC virtual network 44, switching in the whole network is possible by an ARP (Address Resolution Protocol) without the need for any change of settings and operation in the MBH 50. Furthermore, the eNB 10 can directly communicate with the EPC location 40 in which the vEPC 43 that is a communication partner is present, and also communication can be distributed among the EPC locations 40.

Conversion Between PBB and VXLAN

Figure 2:
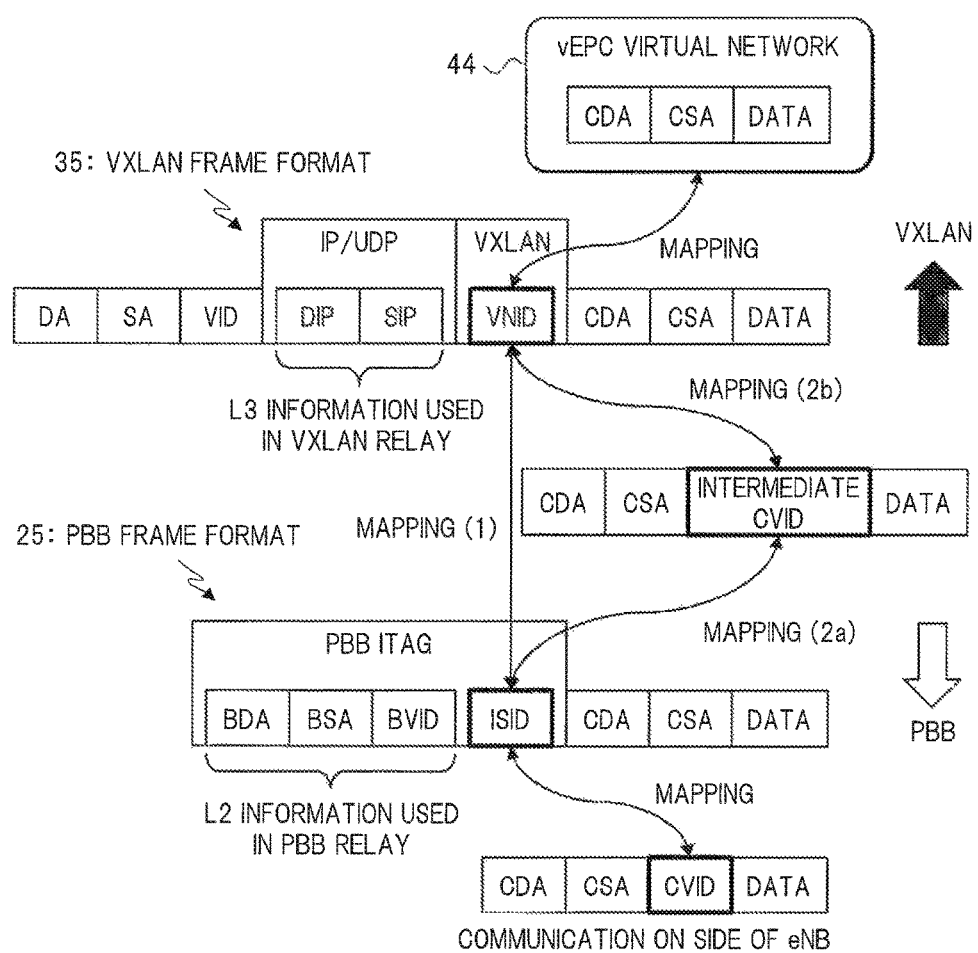
FIG. 2 is a diagram illustrating an outline of an example of mapping between an ISID of PBB and a VNID of VXLAN according to the first embodiment of the present invention.

FIG. 2 is a diagram illustrating an outline of an example of mapping between an ISID of the PBB and a VNID of the VXLAN. FIG. 2 illustrates a VXLAN frame format 35, a PBB frame format 25 and mapping between the VXLAN frame format 35 and the PBB frame format 25.

In a VXLAN region on the upper side of FIG. 2, the VXLAN frame format 35 in which a header of the VXLAN is added to an L2 user frame (CDA (Customer Destination Address), CSA (Customer Source Address) and DATA) in the vEPC virtual network 44 and the L2 user frame is encapsulated by an IP protocol is illustrated. A header of the IP protocol contains L3 information used in VXLAN relay. Meanwhile, in a PBB region on the lower side of FIG. 2, an example of the PBB frame format 25 in which an L2 user frame in communication on the side of eNB 10 is encapsulated by an Ethernet (Registered Trademark, the same applies hereinafter) protocol is illustrated. A header of the Ethernet contains L2 information used in PBB relay. The VXLAN encapsulation and the PBB encapsulation are the same in that the L2 user frame is encapsulated.

In either case, to which virtual network a virtual machine or terminal that sends data before encapsulation belongs needs to be identifiable in data after the encapsulation. This identification is made possible by a VNID (first identifier) in the VXLAN and by an ISID (second identifier) in the PBB. In the VXLAN region, for example, the vEPC virtual network 44 can be mapped to a VNID by using a publicly known management technique or solution concerning a virtual machine or a virtual network by VXLAN. In the PBB region, an ISID is determined by using a CVID (Customer VLAN-ID, 12 bits) for identifying a virtual network (VLAN) to which the eNBs 10 belong before encapsulation, and thus mapping can be performed.

Both of the ISID of the PBB and the VNID of the VXLAN are 24-bit identifiers. Therefore, seamless relay between the PBB region and the VXLAN region can be achieved by conversion/mapping between the ISID of the PBB and the VNID of the VXLAN.

It is also possible to employ a configuration in which the conversion/mapping is directly performed by a single relay device provided at a boundary between the PBB region and the VXLAN region ("mapping (1)" in FIG. 2). Namely, in the case of communication from the PBB region to the VXLAN region, the single relay device decapsulates PBB encapsulated data received from the L2 entrance 20, encapsulates the data by the VXLAN after conversion of an ISID into a VNID, and then transmits the data to the IP core network 30. In the case of communication from the VXLAN region to the PBB region, opposite conversion is performed.

Figure 3:
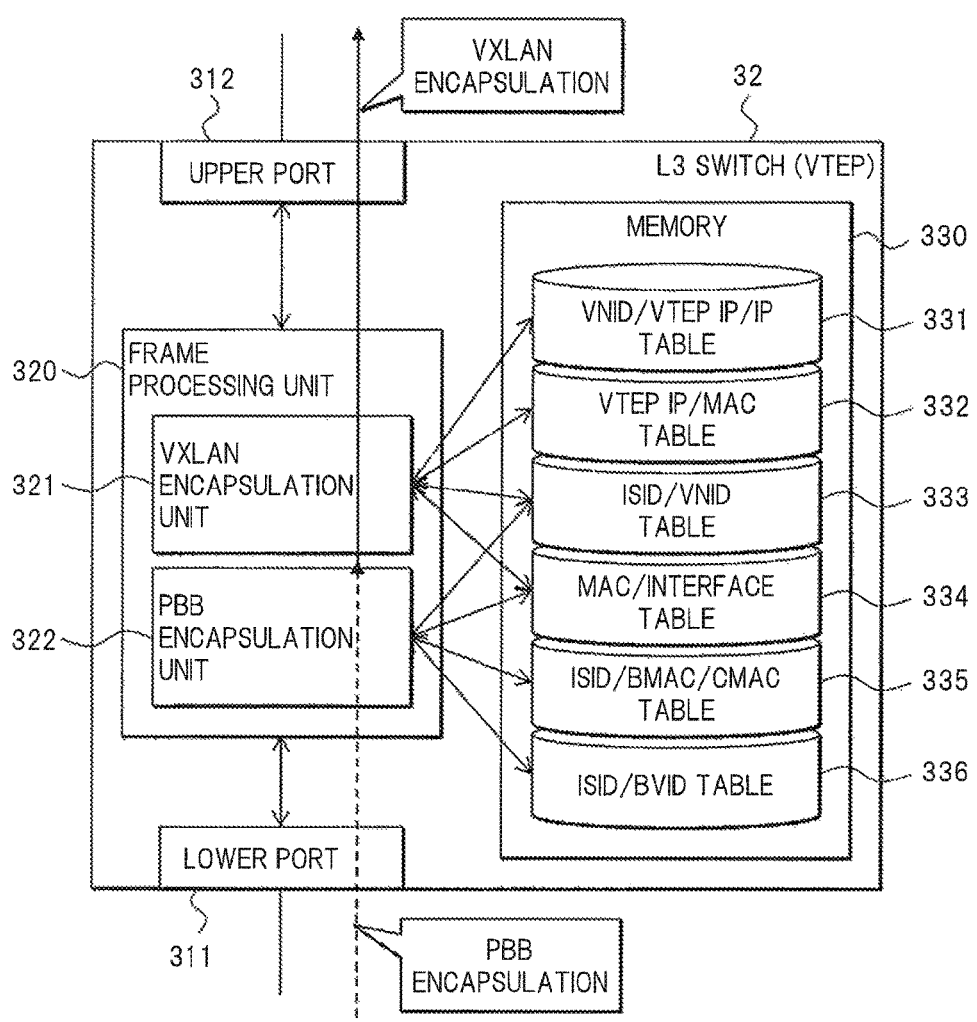
FIG. 3 is a diagram illustrating an outline of an example of a configuration of a relay device in a case where mapping is performed in a single relay device according to the first embodiment of the present invention.

FIG. 3 is a diagram illustrating an outline of an example of a configuration of a relay device in a case where mapping is performed in a single relay device. In this case, the relay device to be a VTEP is constituted of, for example, an L3 switch 32 having functions of a router and an L2 switch. The L3 switch 32 has a function as an end of the PBB in the PBB region and a function as an end of the VXLAN (VTEP).

The L3 switch 32 has, for example, a lower port 311 on a side close to the PBB region and an upper port 312 on a side close to the VXLAN region. Furthermore, the L3 switch 32 has a frame processing unit 320 that has a frame parsing function and a converting function and is constituted of an FPGA (Field-Programmable Gate Array) or an ASIC (Application Specific Integrated Circuit) to relay a frame. The frame processing unit 320 has a VXLAN encapsulation unit 321 and a PBB encapsulation unit 322 that encapsulate/decapsulate PBB and VXLAN data and perform the process of the mapping (1) illustrated in FIG. 2.

Furthermore, in a memory 330, for example, a VNID/VTEP IP/IP table 331, a VTEP IP/MAC table 332, an ISID/VNID table 333, a MAC/interface table 334, an ISID/BMAC/CMAC table 335, an ISID/BVID table 336 and the like are provided as various tables which the frame processing unit 320 refers to.

The VNID/VTEP IP/IP table 331 is a table in which correspondence between IP information of a VTEP and IP information of user data is held. The VTEP IP/MAC table 332 is a table (ARP (Address Resolution Protocol) table) in which correspondence between an IP address and a MAC address of a VTEP is held. The ISID/VNID table 333 is a table in which correspondence between an ISID of the PBB and a VNID of the VXLAN is held.

The MAC/interface table 334 is a table (FDB (Forwarding DataBase)) in which correspondence between a MAC address and an output destination interface is held. The ISID/BMAC/CMAC table 335 is a table in which correspondence between each of an ISID of the PBB and a MAC address or user data (CMAC (Customer MAC)) and an end MAC (BMAC (Backbone MAC)) of the PBB is held. The ISID/BVID table 336 is a table in which correspondence between an ISID of the PBB and a BVID (Backbone VLAN-ID) that determines a broadcast domain of the PBB is held.

The frame processing unit 320 causes the PBB encapsulation unit 322 to decapsulate, for example, PBB encapsulated data received from the lower port 311. The PBB encapsulation unit 322 converts an ISID of the decapsulated data into a VNID by referring to the ISID/VNID table 333. Thereafter, the VXLAN encapsulation unit 321 encapsulates the data by the VXLAN. Then, the frame processing unit 320 transmits the encapsulated data to the VXLAN region via the upper port 312.

Meanwhile, it is also possible to employ a configuration in which the edge router 31c (first relay device) to be a VTEP in the VXLAN region and the edge switch 21c (second relay device) in the PBB region are separately provided and both of the edge router 31c and the edge switch 21c perform conversion/mapping instead of the configuration in which a single relay device directly performs mapping between a VNID and an ISID ("mapping (1)" of FIG. 2) as described above. In this case, the edge switch 21c encapsulates and decapsulates PBB data, and the edge router 31c encapsulates and decapsulates VXLAN data.

In this case, for example, an intermediate CVID (third identifier) is set in a user frame of decapsulated data exchanged between the edge switch 21c and the edge router 31c (VTEP) as illustrated in FIG. 2. Then, the edge switch 21c performs mapping between the ISID and the intermediate CVID, and the edge router 31c performs mapping between the VNID and the intermediate CVID. This makes it possible to perform conversion/mapping between the ISID and the VNID indirectly via the intermediate CVID ("mapping (2a) and (2b)" of FIG. 2).

Figure 4:
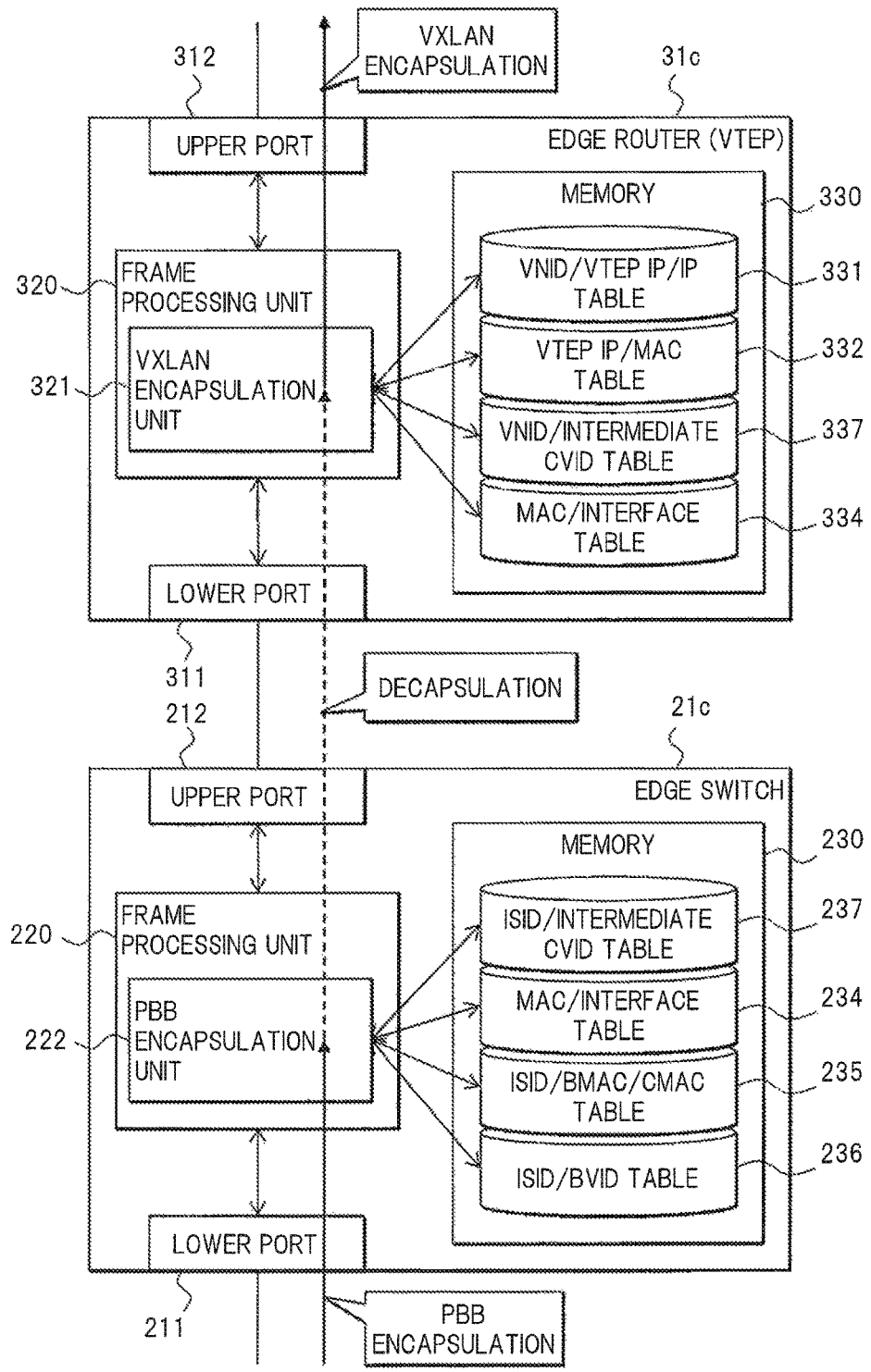
FIG. 4 is a diagram illustrating an outline of an example of configurations of relay devices in a case where mapping is performed in two relay devices according to the first embodiment of the present invention.

FIG. 4 is a diagram illustrating an outline of an example of configurations of relay devices in a case where mapping is performed in two relay devices. The edge switch 21c (second relay device) has a function as an end of the PBB in the PBB region. The edge switch 21c has, for example, a lower port 211 on a side close to the PBB region and an upper port 212 on a side close to the edge router 31c. Furthermore, the edge switch 21c has a frame processing unit 220 that has a frame parsing function and a converting function and is constituted of an FPGA or an ASIC to relay a frame. The frame processing unit 220 has a PBB encapsulation unit 222 that encapsulates/decapsulates the PBB data and performs the process of the mapping (2a) illustrated in FIG. 2.

Furthermore, in a memory 230, for example, a MAC/interface table 234, an ISID/BMAC/CMAC table 235, an ISID/BVID table 236, an ISID/intermediate CVID table 237 and the like are provided as various tables which the frame processing unit 220 refers to. Among them, the MAC/interface table 234, the ISID/BMAC/CMAC table 235 and the ISID/BVID table 236 are similar to those described above in FIG. 3, and repetitive description thereof is omitted. The ISID/intermediate CVID table 237 is a table in which correspondence between an ISID and an intermediate CVID is held.

The frame processing unit 220 causes the PBB encapsulation unit 222 to decapsulate, for example, PBB encapsulated data received from the lower port 211. The PBB encapsulation unit 222 converts an ISID of the decapsulated data into an intermediate CVID by referring to the ISID/intermediate CVID conversion table 237. Then, the frame processing unit 220 transmits the decapsulated data to the edge router 31c via the upper port 212.

The edge router 31c (first relay device) has a function as an end of the VXLAN (VTEP). The edge router 31c has, for example, a lower port 311 on a side close to the edge switch 21c and an upper port 312 on a side close to the VXLAN region. Furthermore, the edge router 31c has a frame processing unit 320 that has a frame parsing function and a converting function and is constituted of an FPGA or an ASIC to relay a frame. The frame processing unit 320 has a VXLAN encapsulation unit 321 that encapsulates/decapsulates the VXLAN data and performs the process of the mapping (2b) illustrated in FIG. 2.

Furthermore, in a memory 330, for example, a VNID/VTEP IP/IP table 331, a VTEP IP/MAC table 332, a MAC/interface table 334, a VNID/intermediate CVID table 337 and the like are provided as various tables which the frame processing unit 320 refers to. Among them, the VNID/VTEP IP/IP table 331, the VTEP IP/MAC table 332 and the MAC/interface table 334 are similar to those described above in FIG. 3, and repetitive description thereof is omitted. The VNID/intermediate CVID table 337 is a table in which correspondence between a VNID and an intermediate CVID is held.

The frame processing unit 320 converts, for example, the intermediate CVID of the decapsulated data received from the lower port 311 into a VNID by referring to the VNID/intermediate CVID conversion table 337. Thereafter, the VXLAN encapsulation unit 321 encapsulates the data by the VXLAN. Then, the frame processing unit 320 transmits the encapsulated data to the VXLAN region via the upper port 312.

Both of the ISID and the VNID are 24 bits, but the intermediate CVID is 12 bits like a CVID of the VLAN. Therefore, there is a possibility that the number of intermediate CVIDs becomes insufficient in theory. However, in the actual network system 1, a plurality of points where the ISID and the VNID are converted are provided (e.g., one point in each prefecture), and the intermediate CVID does not need to be unique in the whole network system 1 and needs to be unique just within a conversion point. Therefore, actually, almost no problem occurs.

Also, in the example of FIG. 4, a configuration in which two relay devices, i.e., the edge switch 21c and the edge router 31c (VTEP) are used is illustrated as a configuration for indirect mapping (2a) and (2b) using the intermediate CVID illustrated in FIG. 2. However, the present embodiment is not limited to this. It is also possible to employ a configuration in which a single relay device (the L3 switch 32) illustrated in FIG. 3 performs indirect mapping via the intermediate CVID.

Figure 5:
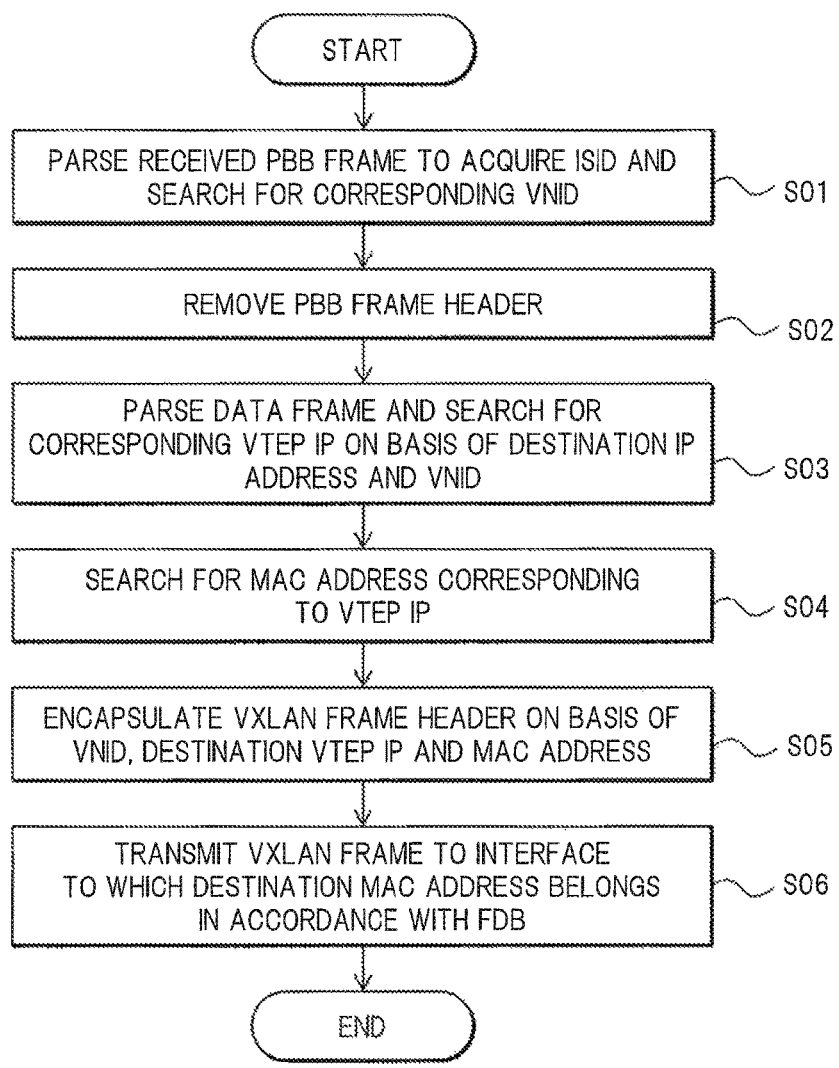
FIG. 5 is a flow chart illustrating an outline of an example of flow of frame processing in a relay device according to the first embodiment of the present invention.

FIG. 5 is a flow chart illustrating an outline of an example of a flow of frame processing in a relay device. A case where a single relay device illustrated in FIG. 3 performs direct mapping between a VNID and an ISID ("mapping (1) of FIG. 2) is described below as an example. FIG. 5 illustrates an example of a flow of processing performed when a unicast frame is transferred from the PBB region to the VXLAN region in the case where necessary path learning is completed on the memory 330 of the L3 switch 32.

The unicast frame from the PBB region is received at the lower port 311 and is transferred to the frame processing unit 320. The frame processing unit 320 causes the PBB encapsulation unit 322 to parse a PBB frame and acquire an ISID. Then, the PBB encapsulation unit 322 acquires a corresponding VNID by searching the ISID/VNID table 333 on the basis of the value of the acquired ISID (S01). Further, the PBB encapsulation unit 322 removes a PBB frame header and transmits the frame to the VXLAN encapsulation unit 321 (S02).

The VXLAN encapsulation unit 321 parses the data frame and acquires a corresponding VTEP IP by searching the VNID/VTEP IP/IP table 331 on the basis of an acquired destination IP address and the value of the VNID (S03). Furthermore, the VXLAN encapsulation unit 321 acquires a corresponding MAC address by searching the VTEP IP/MAC table 332 (ARP table) on the basis of an acquired VTEP IP (S04).

Thereafter, the VXLAN encapsulation unit 321 generates a VXLAN frame header on the basis of the values of the acquired VNID, destination VTEP IP and corresponding MAC address, and encapsulates the frame (S05). Then, the VXLAN encapsulation unit 321 determines a transfer destination interface (the upper port 312) in accordance with the MAC/interface table 334 (FDB) and then transfers the VXLAN frame to the transfer destination interface (S06).

Figure 6:
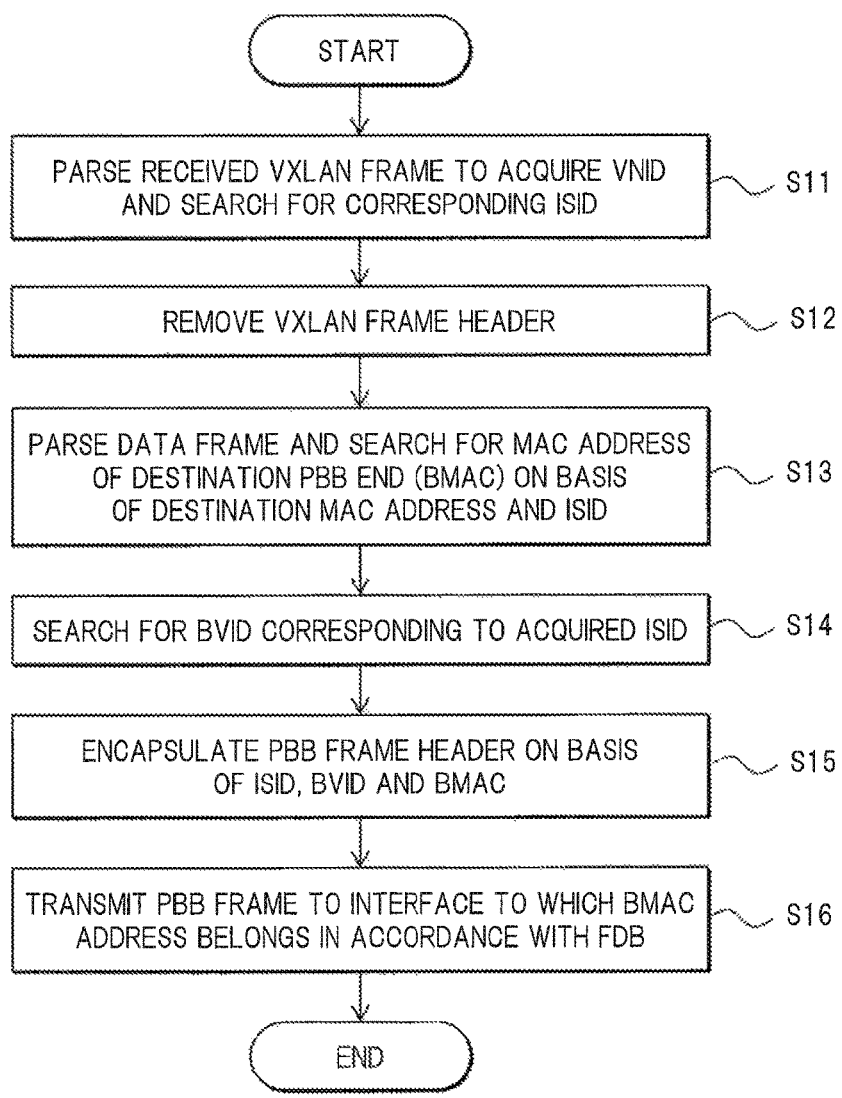
FIG. 6 is a flow chart illustrating an outline of another example of flow of frame processing in a relay device according to the first embodiment of the present invention.

FIG. 6 is a flow chart illustrating an outline of another example of a flow of frame processing in a relay device. FIG. 6 illustrates an example of a flow of processing performed when a unicast frame is transferred from the VXLAN region to the PBB region in a direction opposite to that in the example of FIG. 5 in the case where necessary path learning is completed on the memory 330 of the L3 switch 32.

The unicast frame from the VXLAN region is received at the upper port 312 and is transferred to the frame processing unit 320. The frame processing unit 320 causes the VXLAN encapsulation unit 321 to parse a VXLAN frame and acquire a VNID. Then, the VXLAN encapsulation unit 321 acquires a corresponding ISID by searching the ISID/VNID table 333 on the basis of the value of the acquired VNID (S11). Further, the VXLAN encapsulation unit 321 removes a VXLAN frame header and transmits the frame to the PBB encapsulation unit 322 (S12).

The PBB encapsulation unit 322 parses the data frame and acquires a corresponding MAC address of a destination PBB end by searching the ISID/BMAC/CMAC table 335 on the basis of the acquired destination MAC address and the value of the ISID (S13). Furthermore, the PBB encapsulation unit 322 acquires a corresponding BVID by searching the ISID/BVID table 336 on the basis of the acquired ISID (S14).

Thereafter, the PBB encapsulation unit 322 generates a PBB frame header on the basis of the values of the acquired ISID, BVID and BMAC, and encapsulates the frame (S15). Then, the PBB encapsulation unit 322 determines a transfer destination interface (the lower port 311) in accordance with the MAC/interface table 334 (FDB) and transfers the PBB frame to the transfer destination interface (S16).

As for the path learning in the L3 switch 32 (VTEP), learning in accordance with a VXLAN standard routing protocol and learning of a MAC address using an ARP are performed on the side of the VXLAN. Meanwhile, learning of a MAC address is performed by a data frame on the side of the PBB. However, path learning using a routing protocol does not need to be performed with a remote L3 switch 32 (VTEP). Namely, path information of communication between data centers (the EPC locations 40) is automatically learned by a function of the PBB.

As described above, according to the network system 1 of the first embodiment of the present invention, an L3 network is constructed by applying VXLAN to only part of the MBH 50 on the side close to the vEPC 43 instead of applying VXLAN to the whole MBH 50. Furthermore, an L2 network in which part of the MBH 50 on the side close to the eNB 10 is encapsulated by PBB or the like is constructed and combined with the L3 network by performing conversion/mapping between an ISID and a VNID. This produces an advantage of encapsulation by VXLAN in relocation or the like of the vEPC 43 within the vEPC virtual network 44. Furthermore, since the VXLAN is not applied to the part of the eNB 10 that is not relocated, a range of multicast (the number of VTEPs) in the VXLAN is reduced, and this reduces load of multicast and secures scalability.

Second Embodiment

In order to solve problems similar to those in the first embodiment, a network system according to the second embodiment of the present invention has the following configuration unlike that of the first embodiment. Specifically, relocation or the like of a vEPC 43 within a vEPC virtual network 44 is coped with by applying VXLAN to only a region on an upper side (side of vEPC 43) relative to an MBH 50 instead of applying VXLAN to the whole MBH 50. Furthermore, an L2 core+L2 entrance network in which an entrance and a core network are encapsulated by the PBB or the like is constructed for the part of the MBH 50, and these networks are combined.

Overall Configuration

Figure 7:
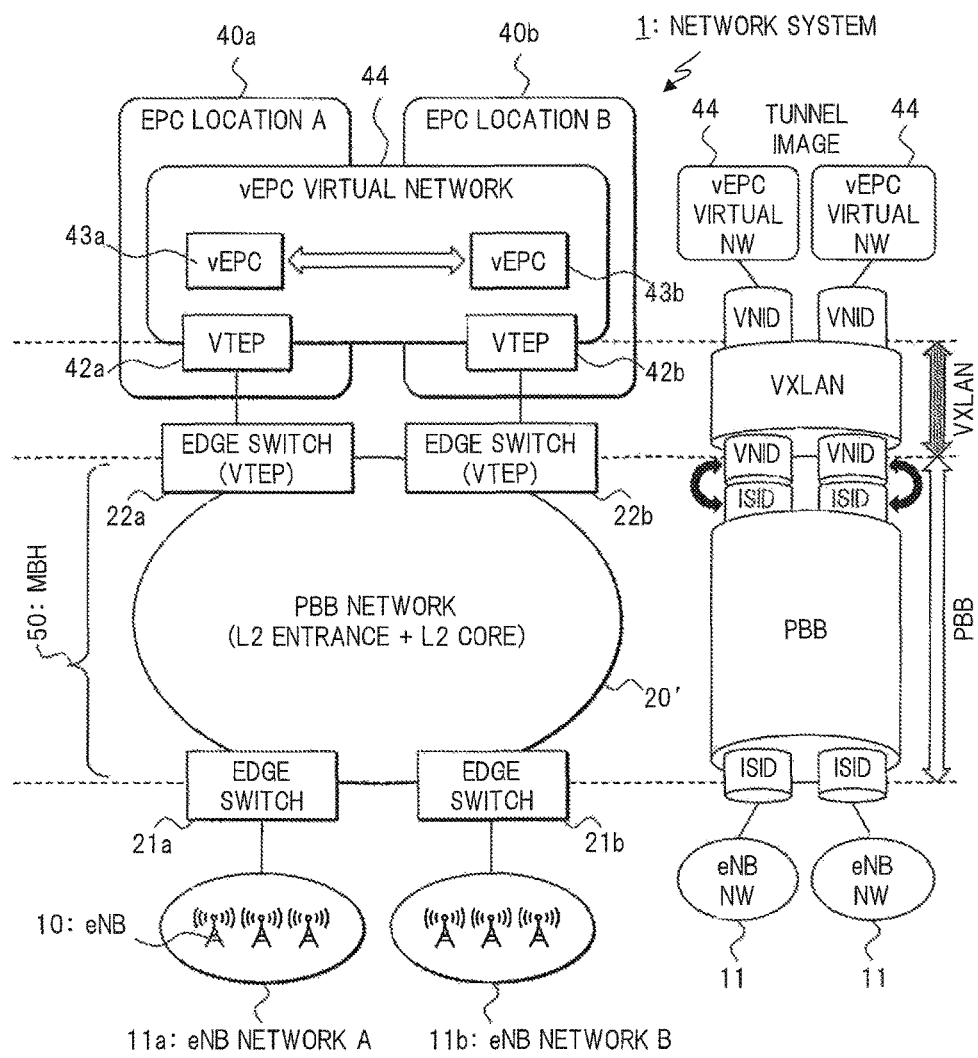
FIG. 7 is a diagram illustrating an outline of an example of a configuration of a network system according to a second embodiment of the present invention and an example of a tunnel image obtained by encapsulation.

FIG. 7 is a diagram illustrating an outline of an example of a configuration of a network system according to the second embodiment of the present invention and an example of a tunnel image obtained by encapsulation. In the example of the configuration illustrated on the left side of FIG. 7, an EPC environment is configured to include vEPCs 43 (vEPCs 43a and 43b FIG. 7) constructed on a vEPC virtual network 44 (first network) in EPC locations 40 (EPC locations A (40a) and B (40b) in FIG. 7), unlike the conventional configuration illustrated in FIG. 10. Furthermore, an MBH 50 has an L2 core+L2 entrance configuration constituted of a PBB network 20' (third network) instead of an L3 core+L2 entrance configuration constituted of an IP core network 30 and an L2 entrance 20.

Further, VXLAN is applied to a region (second network) from the vEPC virtual network 44 to the PBB network 20' (MBH 50), and VTEPs are thus provided at both ends of a VXLAN region. Namely, edge switches 22 (edge switches 22a and 22b in FIG. 7) which are provided at portions of the PBB network 20' close to data centers (the EPC locations 40) and to which the EPC locations 40 are connected are VTEPs. Furthermore, VTEPs 42 (VTEPs 42a and 42b in FIG. 7) are provided at portions of the EPC locations 40 that are connected to the vEPC virtual network 44.

As described above, VXLAN is applied to only the region on the upper side (side of vEPC 43) relative to the MBH 50, and the MBH 50 (the PBB network 20') on the lower side (side of eNB 10) is constituted by PBB. This makes it possible to markedly reduce the number of VTEPs on the lower side by converging the VTEPs into the edge switches 22 like in the first embodiment.

In this configuration, for example, communication from eNB networks 11 is encapsulated (second encapsulation) by PBB (L2 over L2 encapsulation method) in a region of the PBB network 20' (third network) as indicated by the tunnel image illustrated on the right side of FIG. 7. Then, the eNB networks 11 are identified by ISIDs. Meanwhile, a region (second network) from the PBB network 20' to the vEPC virtual network 44 is encapsulated (first encapsulation) by VXLAN (L2 over L3 encapsulation method). Then, the vEPC virtual network 44 is identified by a VNID. Also in the present embodiment, seamless relay between the PBB region and the VXLAN region is achieved by conversion/mapping between an ISID of the PBB and a VNID of the VXLAN by a method similar to that illustrated in FIG. 2 of the first embodiment.

In the present embodiment, the conversion/mapping described above is performed by a relay device (the edge switches 22 in the example of FIG. 7) provided at a boundary between the PBB region and the VXLAN region. Namely, in the case of communication from the PBB region to the VXLAN region, the edge switches 22 decapsulate PBB encapsulated data received from the PBB network 20', encapsulate the data by the VXLAN after conversion of an ISID into a VNID, and then transmit the data to a VTEP 42 of a corresponding EPC location 40. In the case of communication from the VXLAN region to the PBB region, opposite conversion is performed.

Figure 8:
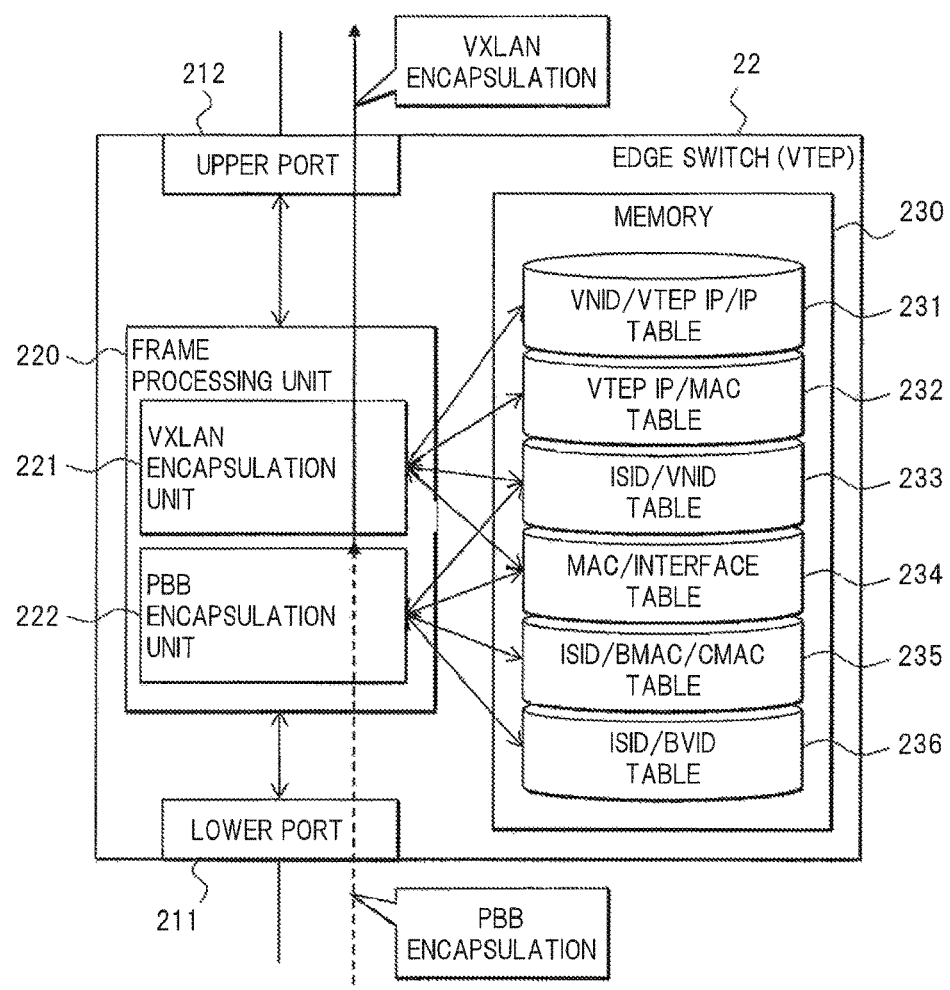
FIG. 8 is a diagram illustrating an outline of an example of a configuration of a relay device in a case where mapping is performed in a single relay device according to the second embodiment of the present invention.

FIG. 8 is a diagram illustrating an outline of an example of a configuration of a relay device in a case where mapping is performed in a single relay device. The edge switch 22 that is a relay device has a function as an end of the PBB in the PBB network 20' and a function as an end of the VXLAN (VTEP). The edge switch 22 has, for example, a lower port 211 on the side close to the PBB region and an upper port 212 on the side close to the VXLAN region. Furthermore, the edge switch 22 has a frame processing unit 220 that has a frame parsing function and a converting function and is constituted of an FPGA or an ASIC to relay a frame. The frame processing unit 220 has a VXLAN encapsulation unit 221 and a PBB encapsulation unit 222 that encapsulate/ decapsulate PBB and VXLAN data and perform the process of the mapping (1) illustrated in FIG. 2.

Furthermore, in a memory 230, for example, a VNID/VTEP IP/IP table 231, a VTEP IP/MAC table 232, an ISID/VNID table 233, a MAC/interface table 234, an ISID/BMAC/CMAC table 235, an ISID/BVID table 236 and the like are provided as various tables which the frame processing unit 220 refers to.

Functions of the aforementioned units, contents of the tables, overall operations concerning conversion/mapping between an ISID and a VNID in frame relay and the like are similar to those in the L3 switch 32 illustrated in FIG. 3 of the first embodiment, and repetitive description thereof is omitted.

Figure 9:
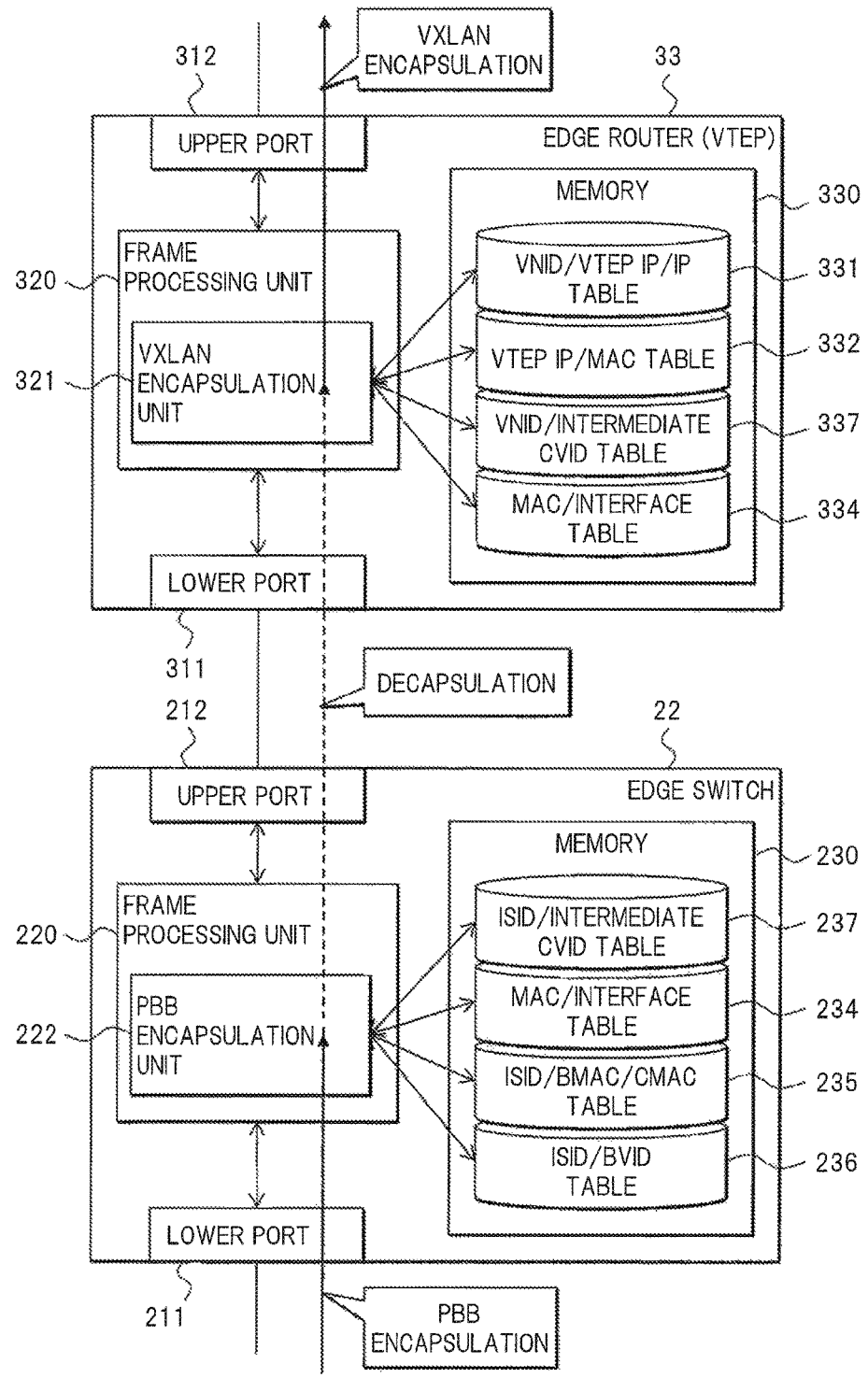
FIG. 9 is a diagram illustrating an outline of an example of configurations of relay devices in a case where mapping is performed in two relay devices according to the second embodiment of the present invention.

FIG. 9 is a diagram illustrating an outline of an example of configurations of relay devices in a case where mapping is performed in two relay devices. The edge switch 22 (second relay device) has a function as an end of the PBB in the PBB network 20'. The edge switch 22 has, for example, a lower port 211 on a side close to the PBB region and an upper port 212 on a side close to the edge router 33. Furthermore, the edge switch 22 has a frame processing unit 220 that has a frame parsing function and a converting function and is constituted of an FPGA or an ASIC to relay a frame. The frame processing unit 220 has a PBB encapsulation unit 222 that encapsulates/decapsulates the PBB data and performs the process of the mapping (2a) illustrated in FIG. 2.

Furthermore, in a memory 230, for example, a MAC/interface table 234, an ISID/BMAC/CMAC table 235, an ISID/BVID table 236, an ISID/intermediate CVID table 237 and the like are provided as various tables which the frame processing unit 220 refers to.

Functions of the aforementioned units, contents of the tables, overall operations concerning conversion/mapping between an ISID and an intermediate CVID in frame relay and the like are similar to those in the edge switch 21c illustrated in FIG. 4 of the first embodiment, and repetitive description thereof is omitted.

An edge router 33 (first relay device) has a function as an end of the VXLAN (VTEP). The edge router 33 has, for example, a lower port 311 on a side close to the edge switch 22 and an upper port 312 on a side close to the VXLAN region. Furthermore, the edge router 33 has a frame processing unit 320 that has a frame parsing function and a converting function and is constituted of an FPGA or an ASIC to relay a frame. The frame processing unit 320 has a VXLAN encapsulation unit 321 that encapsulates/decapsulates the VXLAN data and performs the process of the mapping (2b) illustrated in FIG. 2.

Furthermore, in a memory 330, for example, a VNID/VTEP IP/IP table 331, a VTEP IP/MAC table 332, a MAC/interface table 334, a VNID/intermediate CVID table 337 and the like are provided as various tables which the frame processing unit 320 refers to.

Functions of the aforementioned units, contents of the tables, overall operations concerning conversion/mapping between a VNID and an intermediate CVID in frame relay and the like are similar to those in the edge router 31c illustrated in FIG. 4 of the first embodiment, and repetitive description thereof is omitted.

As described above, according to the network system 1 of the second embodiment of the present invention, VXLAN is applied to only a region on an upper side (side of vEPC 43) relative to the MBH 50 instead of applying VXLAN to the whole MBH 50. Furthermore, an L2 core+L2 entrance network in which an entrance and a core network are encapsulated by the PBB or the like is constructed in the MBH 50. Then, these networks are combined by conversion/mapping between an ISID and a VNID. This makes it possible to obtain the effects similar to those in the first embodiment.

In the foregoing, the invention made by the inventors of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

For example, the configuration of the network system 1 is not limited to those illustrated in FIGS. 1 and 7 and can be another one. For example, the configuration of the network system 1 is not limited to the configuration in which the eNBs 10 directly communicate with the vEPCs 43 and are provided with no default gateway like those illustrated in FIGS. 1 and 7. It is also possible to employ a configuration in which a virtual router is provided as a default gateway by using a virtual machine in the vEPC virtual network 44 of the EPC location 40 so that a virtual network containing communication from the eNBs 10 is constructed. In this case, communication from the eNBs 10 is relayed once to the EPC location 40 in which the virtual router is present and is then routed to the vEPCs 43 on the vEPC virtual network 44.

Furthermore, for example, it is also possible to employ the configuration in which the edge switch 21c on an upper side of the L2 entrance 20 in the configuration illustrated in FIG. 1 selects the case where communication with the vEPC 43 is performed by relaying data to the edge router 31c that is a VTEP like in the first embodiment and the case where communication with the existing physical EPC device 45 is performed without encapsulation by VXLAN by relaying data to the edge router 31c in the example illustrated in FIG. 10, in accordance with a value of an ISID of data encapsulated by the PBB. Namely, the network system 1 can have a configuration in which the configuration illustrated in FIG. 1 and the existing configuration illustrated in FIG. 10 are provided in combination.

In each of the above embodiments, VXLAN is used as an encapsulation technique used to separate an IP address used in the vEPCs 43 and the eNBs 10 from a routing process in the MBH 50, but the present invention is not limited to this. For example, the network system 1 can be configured on the basis of a similar idea even by using another encapsulation technique such as an EVPN (Ethernet (Registered Trademark) VPN).

What is claimed is:

1. A network system comprising:
   a second network that is connected to a first network, at least part of which is constituted of a virtual machine on a virtual network, and that transfers first encapsulated data obtained by first encapsulation using a data link layer (L2) over network layer (L3) encapsulation method;

a third network that is connected to the second network and transfers second encapsulated data obtained by second encapsulation using an L2 over L2 encapsulation method;

a first relay device that belongs to the second network, is connected to the third network, and performs a process concerning the first encapsulation; and a second relay device that belongs to the third network, is connected to the second network, and performs a process concerning the second encapsulation, wherein the first relay device performs conversion between a first identifier of data encapsulated by the first encapsulation in the second network and a third identifier of decapsulated data exchanged with the second relay device, the second relay device performs conversion between a second identifier of data encapsulated by the second encapsulation in the third network and the third identifier of the decapsulated data exchanged with the first relay device, the first encapsulation is encapsulation by VXLAN (Virtual eXtensible Local Area Network) and the second encapsulation is encapsulation by PBB (Provider Backbone Bridging), the first identifier is a VNID (VXLAN Network Identifier) and the second identifier is an ISID (Service Instance ID), the first network is a vEPC (Evolved Packet Core) virtual network in a mobile network system, and an eNB (evolved Node B: base station) network in the mobile network system is connected to the third network.

2. The network system according to claim 1, wherein the first network is constructed in each location, and the third network includes a core network.

3. A network system comprising:

a second network that is connected to a first network, at least part of which is constituted of a virtual machine on a virtual network, and that transfers first encapsulated data obtained by first encapsulation using a data link layer (L2) over network layer (L3) encapsulation method;

a third network that is connected to the second network and transfers second encapsulated data obtained by second encapsulation using an L2 over L2 encapsulation method; and a relay device that connects the second network and the third network and performs a process concerning the first encapsulation and a process concerning the second encapsulation, wherein the relay device performs conversion between a first identifier of data encapsulated by the first encapsulation in the second network and a second identifier of data encapsulated by the second encapsulation in the third network, the first encapsulation is encapsulation by VXLAN (Virtual eXtensible Local Area Network) and the second encapsulation is encapsulation by PBB (Provider Backbone Bridging), and the first identifier is a VNID (VXLAN Network Identifier) and the second identifier is an ISID (Service Instance ID), the first network is a vEPC (Evolved Packet Core) virtual network in a mobile network system, and an eNB (evolved Node B: base station) network in the mobile network system is connected to the third network.

4. The network system according to claim 3, wherein the first network is constructed in each location, and the third network includes a core network.

5. The network system according to claim 3, wherein the relay device performs conversion between the first identifier of data encapsulated by the first encapsulation in the second network and a third identifier of decapsulated data and conversion between the third identifier of the decapsulated data and the second identifier of data encapsulated by the second encapsulation in the third network.

6. A relay device in a network system, the network system including:

a second network that is connected to a first network, at least part of which is constituted of a virtual machine on a virtual network, and that transfers first encapsulated data obtained by first encapsulation using a data link layer (L2) over network layer (L3) encapsulation method; and a third network that is connected to the second network and transfers second encapsulated data obtained by second encapsulation using an L2 over L2 encapsulation method, the relay device connecting the second network and the third network and performing a process concerning the first encapsulation and a process concerning the second encapsulation, and the relay device performing conversion between a first identifier of data encapsulated by the first encapsulation in the second network and a second identifier of data encapsulated by the second encapsulation in the third network, wherein the first encapsulation is encapsulation by VXLAN (Virtual eXtensible Local Area Network) and the second encapsulation is encapsulation by PBB (Provider Backbone Bridging), the first identifier is a VNID (VXLAN Network Identifier) and the second identifier is an ISID (Service Instance ID), the relay device performing conversion between the first identifier of data encapsulated by the first encapsulation in the second network and a third identifier of decapsulated data and conversion between the third identifier of the decapsulated data and the second identifier of data encapsulated by the second encapsulation in the third network, the first network is a vEPC (Evolved Packet Core) virtual network in a mobile network system, and an eNB (evolved Node B: base station) network in the mobile network system is connected to the third network.

* * * * *